(12) United States Patent
VanBlon et al.

(10) Patent No.: US 11,190,485 B2
(45) Date of Patent: Nov. 30, 2021

(54) NAMING SMART DEVICES

(71) Applicant: Lenovo (Singapore) Pte. Ltd., Singapore (SG)

(72) Inventors: Russell VanBlon, Raleigh, NC (US); Robert Kapinos, Durham, NC (US); Timothy Winthrop Kingsbury, Cary, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/600,032

(22) Filed: Oct. 11, 2019

(65) Prior Publication Data

US 2021/0112031 A1    Apr. 15, 2021

(51) Int. Cl.
*H04L 29/12*     (2006.01)
*H04W 4/02*      (2018.01)
*H04L 29/08*     (2006.01)

(52) U.S. Cl.
CPC ...... *H04L 61/3065* (2013.01); *H04L 61/3015* (2013.01); *H04L 67/16* (2013.01); *H04W 4/023* (2013.01)

(58) Field of Classification Search
CPC .............. H04L 63/3015; H04L 61/3065
See application file for complete search history.

(56) References Cited

U.S. PATENT DOCUMENTS

| 8,170,583 | B2 * | 5/2012 | Shkedi | G01S 5/0252 |
| | | | | 455/456.1 |
| 8,816,848 | B2 * | 8/2014 | Marino | G08C 17/02 |
| | | | | 340/539.13 |
| 2007/0105500 | A1 * | 5/2007 | Kim | H04W 8/26 |
| | | | | 455/41.2 |
| 2015/0348403 | A1 * | 12/2015 | Berelejis | H04L 12/2809 |
| | | | | 367/197 |

* cited by examiner

*Primary Examiner* — Esther B. Henderson
(74) *Attorney, Agent, or Firm* — man Lundberg & Woessner, P.A.

(57) ABSTRACT

A computer implemented method of naming a smart wireless device includes detecting a first other wireless device, determining that the first other wireless device is likely in a same area of an environment, obtaining a first name of the first other wireless device, and generating a name for the smart wireless device as function of the first name of the first other wireless device in response to the first other wireless device having been determined to be in the same area of the environment.

17 Claims, 6 Drawing Sheets

| SMART DEVICE | 1A | NAME |
|---|---|---|
| DISHWASHER | A | KITCHEN DISHWASHER |
| OVEN | B | KITCHEN OVEN |
| REFRIGERATOR | C | KITCHEN REFRIDGERATOR |
| LIGHTBULB | D | KITCHEN LIGHTBULB |
| LIGHTBULB | E | KITCHEN LIGHTBULB 2 |
| WASHER | F | UTILITY WASHER |
| DRYER | G | UTILITY DRYER |
| LIGHTBULB | H | UTILITY LIGHTBULB |
| LIGHTBULB | I | BR1 LIGHTBULB |
| TV | J | BR1 TV |
| LIGHTBULB | K | BR2 LIGHTBULB |
| ASSISTANT | L | LR ASSISTANT |
| TV | M | LR TV |
| LIGHTBULB | N | LR LIGHTBULB 1 |
| LIGHTBULB | O | LR LIGHTBULB 2 |
| LIGHTBULB | P | LR LIGHTBULB 3 |
| LIGHTBULB | Q | LR LIGHTBULB 4 |
| ⋮ | ⋮ | ⋮ |

FIG. 3

NAMING SMART DEVICES

BACKGROUND

Naming and categorizing smart devices in a smart home can be difficult. A user, such as a home owner, is usually tasked to name devices such as lights, motion sensors, door locks, window locks, smart blinds, fans, and other smart devices commonly found in a home. As smart home devices multiple in numbers, such naming becomes a burden for every new smart home device added.

SUMMARY

A computer implemented method of naming a smart wireless device includes detecting a first other wireless device, determining that the first other wireless device is likely in a same area of an environment, obtaining a first name of the first other wireless device, and generating a name for the smart wireless device as function of the first name of the first other wireless device in response to the first other wireless device having been determined to be in the same area of the environment.

BRIEF DESCRIPTION OF THE DRAWINGS

FIG. 3 is a representation of data structure 300 for use by the naming mechanism in managing and generating names for smart devices according to an example environment.

Figure 1:
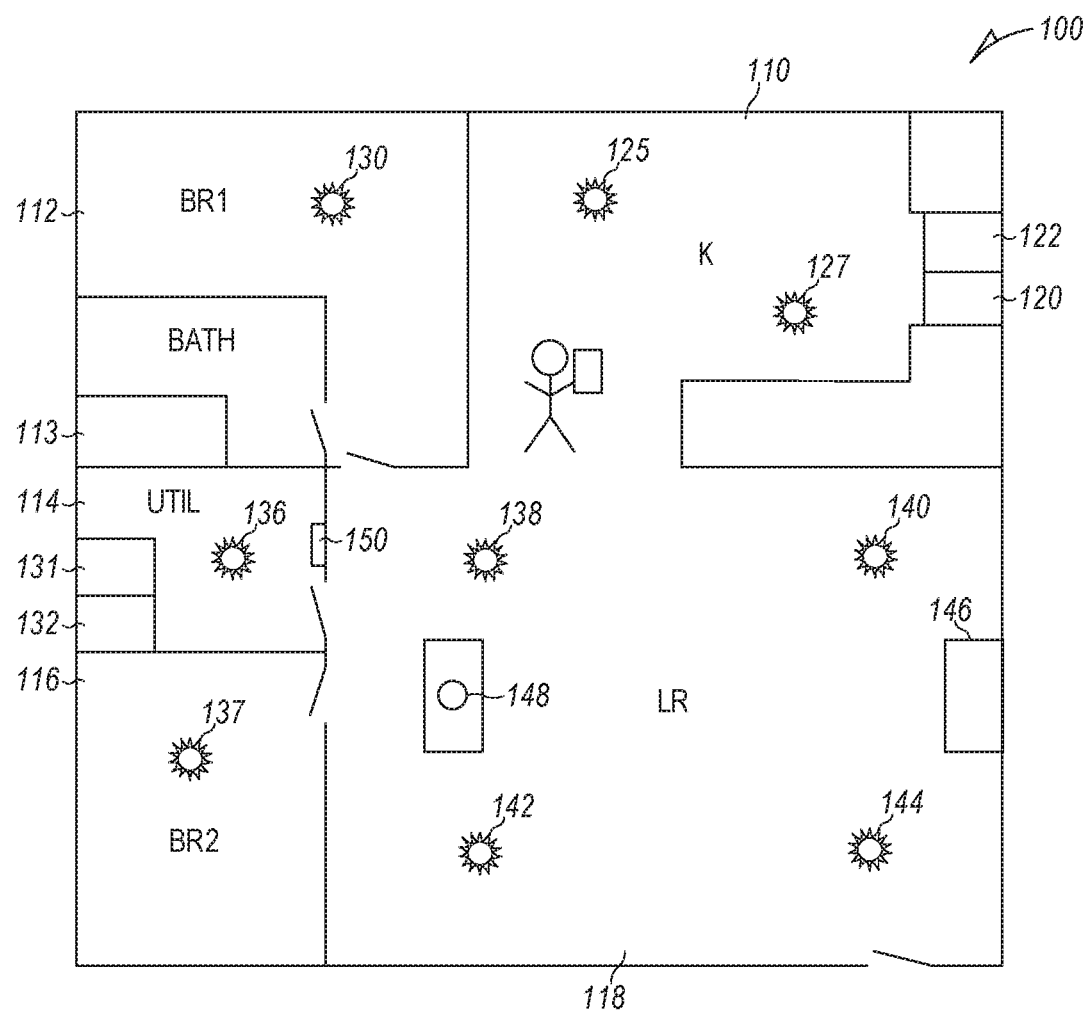
FIG. 1 is a block schematic diagram illustrating an example home floorplan with smart devices according to an example embodiment.

DETAILED DESCRIPTION in the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A user, such as a home owner, is usually tasked with naming name smart devices such as lights, motion sensors, door locks, window locks, smart blinds, fans, and other smart devices commonly found in an environment such as a home. For example, if a recently installed smart lightbulb turns on for the first time, the user must use a user interface on a computing device, such as a phone, tablet, laptop, intelligent assistant, control panel of a security system or one or more of the smart devices, or other computing device to provide a name for the lightbulb. The name is used by the computing device to facilitate selection of the light bulb for the user and the computing device to interact with the bulb. For instance, the computing device may provide one or more menus to show the status of the light bulb and a simple on/off icon for selection by the user. In the case of an intelligent assistant as the computing device, a user may provide voice commands to interact with one or more smart devices.

A further menu generated by the computing device may show options for generating a schedule for the light bulb, dimming the lightbulb, changing the spectrum emitted by the light bulb, and other possible functions for smart lightbulbs. Other smart devices may also have menus to allow control of their functions via the computing device. Thus, the name of the device can be, very important in helping the user determine what the smart device is, and where it is located in the home so that the user can quickly find the right menus to control the right smart devices. Note that a home may include an apartment, a house, a condo, or other dwelling suitable for human shelter.

The customized naming of intelligent devices has previously been left up to the user. Such devices among other may include lights, motion sensors, door locks, window locks, smart blinds, fans, etc. Usually these are named by the room they are located in. Without locations/names, it can be very difficult to identify a smart device using a voice assistant or visible menu.

In various embodiments of the present inventive subject matter, a naming mechanism automatically names a device by analyzing locations and/or names of nearby devices. For example, if a smart lightbulb turns on for the first time and identifies a smart dishwasher and smart stove nearby, the naming mechanism reasonably infers that it is in a kitchen. This would result in name such as Lightbulb/Kitchen. If there are other smart lightbulbs already in the kitchen, the name given may be Lightbulb/Kitchen/n, where n is 1+ the number of smart bulbs already in the kitchen.

If that same smart lightbulb is found to be near a smart washer or smart dryer, the naming mechanism reasonably infers that the smart lightbulb is in the laundry room. If the same smart lightbulb identifies a smart bathtub faucet nearby, the naming mechanism infers that the smart lightbulb is installed a bathroom.

The naming mechanism works for devices that are typically in a single specific room. When adding devices with no prior "room-specific" smart devices, the added device may communicate with devices manually configured by the user at an earlier time. For example, if a new "Amazon Dot" were added in a living room and there's a smart light already in the same living room, those devices could communicate to tell the Amazon Dot that it is location is in a living room. The naming mechanism would allow a user to refer to that device as the "Master bedroom digital assistant." if equipped with the proper sensors (e.g. camera) to detect walls/distance, a smart device could look at the size of the room (or doorways) to determine if the smart device is in a small room such as a foyer, a large family room, or other type of room.

Elevation may additionally be detected and analyzed to detect a basement, attic, or even upstairs bedroom vs a downstairs bedroom. There are times when multiple devices in different rooms will show up, but signal strength, triangulation, GPS location, or other information may be received from such multiple devices may be used to determine which devices are closest, which devices are through walls, etc., by analyzing such signals. For open floor plans where multiple connected rooms may exist, the user may be prompted by the naming mechanism to choose between those two rooms instead of selecting from a list of a dozen rooms, or even more burdensome, typing in a room name.

If a device were added in a room that no other devices were seen in, the naming mechanism may identify which room in which the added device is in by process of elimination. For example, if other rooms are known, the new room would also be known to be something other than those rooms (even if that included multiple rooms.)

The naming mechanism may also be used for smart devices in a work environment. For example, adding a smart device to conference room named 2H8 that has a wireless device would allow an added smart device to detect which room the added smart device was located in. Naming may be dynamic as smart devices are moved from room to room, since the naming mechanism allows the moved smart device to automatically reconfigure the name to match the new room. The naming mechanism make it easier to add new devices without having to go through painful manual configuration involving significant user interaction and input. Using the naming mechanism, a user would have to name a single device in each room at most, and from then on, new devices would "know" which room they were placed in.

FIG. 1 is a block diagram illustrating an example home floorplan 100 having multiple smart devices. The floorplan 100 includes a kitchen 100, first bedroom 111, which may be a master bedroom having a bathroom 112 with a bathtub having an intelligent faucet 113. The floorplan 100 includes a utility room 114, a second bedroom 116, and a living room 118. Several intelligent devices are shown in the various rooms such as washing machine 120, oven 122, light 125, lightbulb 127 in kitchen 110. Bedroom 112 includes at least a lightbulb 130. Utility room 114 includes a washer 131, dryer 132, and lightbulb 136. Living room 118 is shown as including lightbulbs 138, 140, 142, and 144, television 146, and intelligent assistant 148. Floorplan 100 is just an example, and there may be many more or fewer intelligent devices installed in further environments, such as homes.

The naming mechanism may be in the form of a programmed machine capable of communicating with the smart devices via one or more wireless connections, such as WIFI (via router 150) or Bluetooth wireless protocols. The programmed machine may be a smartphone 152 shown being held by a user 154 in floorplan 100. In further embodiments, the naming mechanism may run on the intelligent assistant 138. The naming mechanism may communicate directly with smart devices, or via router 150. The smartphone may also communicate with router 150 via one or more mobile networks or other networks coupled to the router 150 to allow control of smart devices while away from home.

Figure 2:
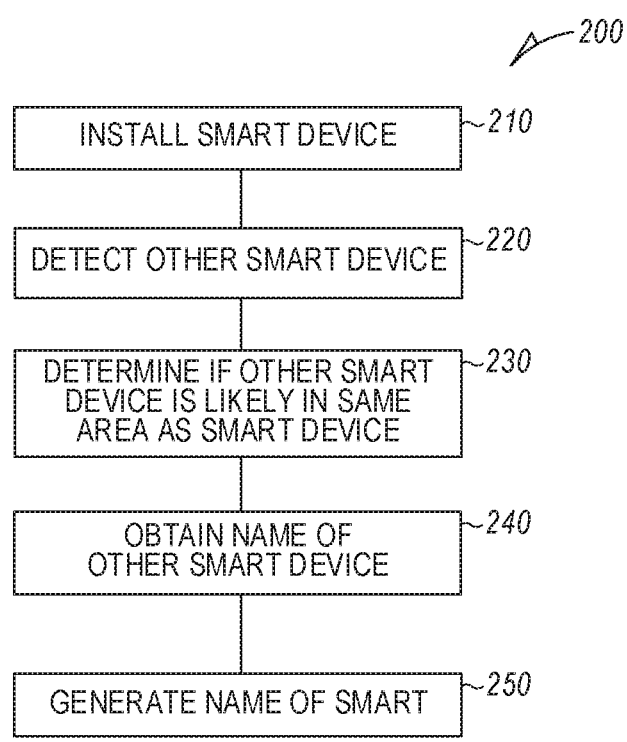
FIG. 2 is a flowchart illustrating a computer implemented method 200 of naming smart devices according to an example environment.

FIG. 2 is a flowchart illustrating a computer implemented method 200 of naming smart devices according to an example environment. Method 200 includes several operations performed by programed computing resources. The computing resources may be located within one or more smart devices, a router which may also be a smart device, a user device, or any networked computing resources such as cloud-based resources. At operation 210, a newly installed smart wireless device is powered on. Following powering on of a newly installed smart device, the smart device detects a first other wireless device at operation 220, such as by using a discovery mode in a Bluetooth wireless protocol. In some embodiments, multiple other wireless devices may be detected, with the wireless device having the strongest signal selected as the first other wireless device.

At operation 230, a determination is made whether or not the first other wireless device is likely in a same area of an environment. In the case of a home environment, the determination may be made that the other device is in the same room based on a threshold value. The threshold value may be set based on the fact that walls between devices reduce the signal strength. In one embodiment, the signal strength threshold is calculated based on an average size of a room and the likely distance between smart devices. Since even distance alone reduces received signal power levels, the threshold serves as a good parameter for determining if the other wireless device is in the same room.

Following such determination that the other wireless device is in the same room, operation 240 obtains a first name of the first other wireless device. The name may already be known based on signals received from the first other wireless device or may be received directly from the first other wireless device or via a table of wireless devices maintained by other computing resources. Based on the name of the first other wireless device, operation 250 generates a name for the smart wireless device as function of the first name of the first other wireless device in response to the first other wireless device having been determined to be in the same area of the environment. The name is then recorded for use the naming mechanism to help users identify and control installed smart devices. The first name may be a name of a room or other area in a home where the environment corresponds to a home. In other embodiments, the area may correspond to a conference room of a building housing a business.

The first name contains an identifier of the same area, and the generated name includes the identifier of the same area and an identifier of the smart wireless device, which is known to the smart wireless device. While the term "first name" is used for convenience of description, the actual name of the other device may include an identifier of the type of device first, or the area may be the first part of the name of the other device. Thus, the names that are generated may contain information about the smart device in any order, and may include a room or area, a type of the smart device, and other information distinguishing other smart devices in the same area and of the same type.

In some embodiments, smart devices may contain UPS circuitry for determining a general location of the smart device that can also be used to help identify an area where the smart device is installed. Altitude sensors can also be used to help identify a level of the environment, such as a home or other structure. Such UPS and altitude information can be used to verify the likely, location of the smart device derived some signal strengths. In one example, a likely area may be identified, but if the altitude or UPS information conflicts, the user may be provided a list of likely areas based on signals received from nearby other devices. The user may then select the closest device for use in automatic naming or may enter a name themselves.

In some embodiments, a user can use a phone, tablet, or other portable device to walk through a home to determine the location of smart devices based on signal strength. While the name of a device may be helpful in finding installed smart devices, the ability to find one particular device such as smoke detector with a low battery can be very helpful, especially where there are multiple installed smoke detectors, some of which may be near each other. A user interface can be used to select a device for finding, with a numeric or graphic representation of signal strength, or a list of nearby devices can be displayed with the list being ordered based on the strongest signal being received. A combination of list and signal strength representation may be used in further embodiments.

FIG. 3 is a representation of data structure 300 for use by the naming mechanism in managing and generating names for smart devices. Data structure 300 may take the form a spreadsheet, markup language format, delineated strings, relational database table, or any other form usable by computing resources implementing the naming mechanism. In one embodiment, data structure 300 includes multiple fields, such as a smart device identifier 310, and M 320, such as a MAC address which is unique for each device or any other type of identifier, and a corresponding name 330. The ID 320 field is filled in with letters for convenience of graphical representation, but in actual embodiments may include a 48-bit unique identifier assigned to a network interface controller included in each smart device. The name 330 may include two or more parts, such as an area identifier and a device identifier. In some embodiments, a further distinguishing element, such as a number or letter may, be added to a name as indicated at 340, where a living room lightbulb is given the number 3 as it is the third lightbulb in the living room: "LR LIGHTBULB 3." Other devices illustrated in FIG. 3 include a dishwasher, oven, refrigerator, numerous lightbulbs in different rooms, washer, dryer, TVs, and a personal assistant. Others might include smoke detectors, thermostats, furnace, air conditioner, microwave oven, etc.

While the list is shown as complete, new entries are added as smart devices are installed and first turned on, with the names being generated by the naming mechanism. Note that the list may also include wireless devices that are not normally thought of as smart wireless devices, such as routers and WiFi repeaters. Such wireless devices may also be used by the naming mechanism to identify locations of newly installed smart devices.

Figure 4:
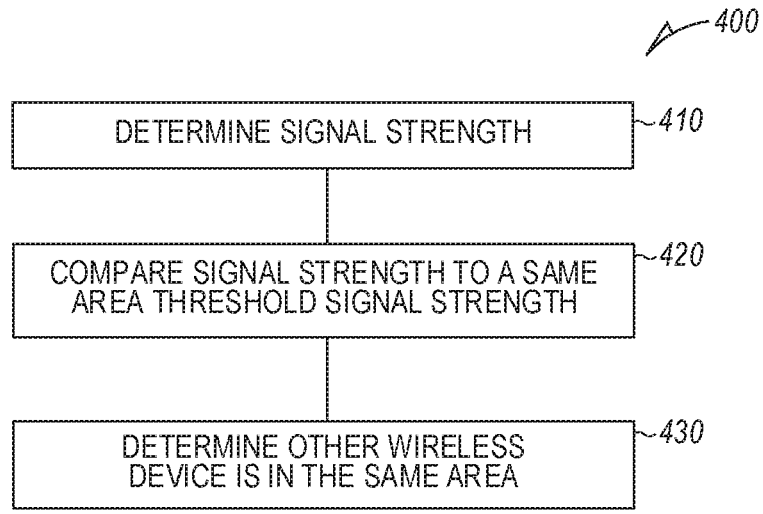
FIG. 4 is a flowchart illustrating a computer implemented method of determining that the first other wireless device is likely in the same area of an environment according to an example environment.

FIG. 4 is a flowchart illustrating a computer implemented method 400 of determining that the first other wireless device is likely in the same area of an environment. At operation 410, a signal strength is determined based on signals received from the first other wireless device. Bluetooth devices automatically determine the signal strength. Other wireless protocols, including WiFi, having similar signal strength determining means may also be used. At operation 420, the determined signal strength is compared to a same area threshold signal strength. As described above, the threshold may be set based on the size of the room if known or otherwise audibly detected by the smart device by timing signals reflected from structures defining the room to ensure the threshold is suitable for the particular room. At operation 430, the method 400 determines that the first other wireless device is in the same area of the environment responsive to such comparing. The signal strength being greater than, or at least equal to the same area threshold may be used to determine that the first other wireless device is in the same area of the environment.

Figure 5:
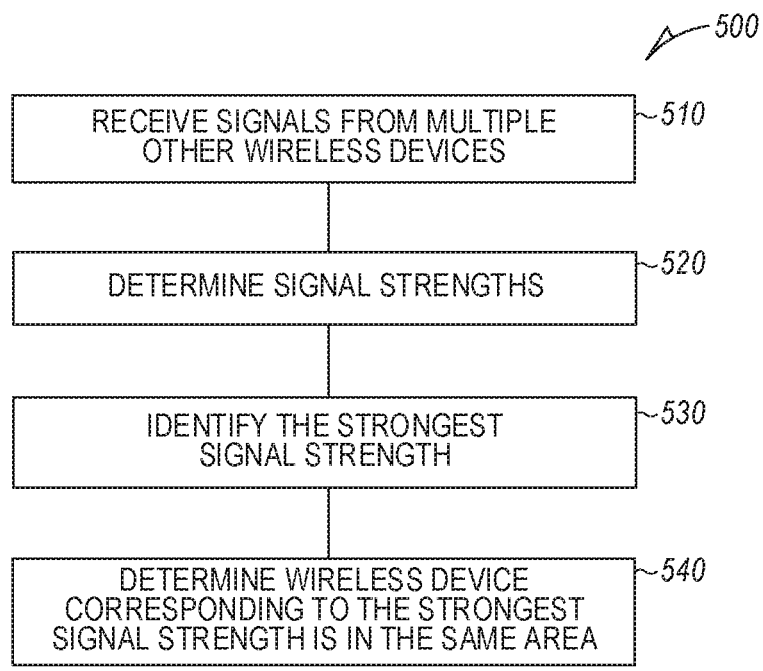
FIG. 5 is a flowchart illustrating an alternative computer implemented method of determining that the first other wireless device is likely, in the same area of an environment according to an example environment.

FIG. 5 is a flowchart illustrating an alternative computer implemented method 500 of determining that the first other wireless device is likely in the same area of an environment. At operation 510, signals are received from multiple other wireless devices. The signal strengths are determined at operation 520 based on the signals received from the multiple other wireless devices. The determined signal strengths are compared at operation 530 to identify the strongest signal strength. At operation 540, it is determined by the naming mechanism that the other wireless device corresponding to the strongest signal strength is in the same area of the environment responsive to such comparing.

Figure 6:
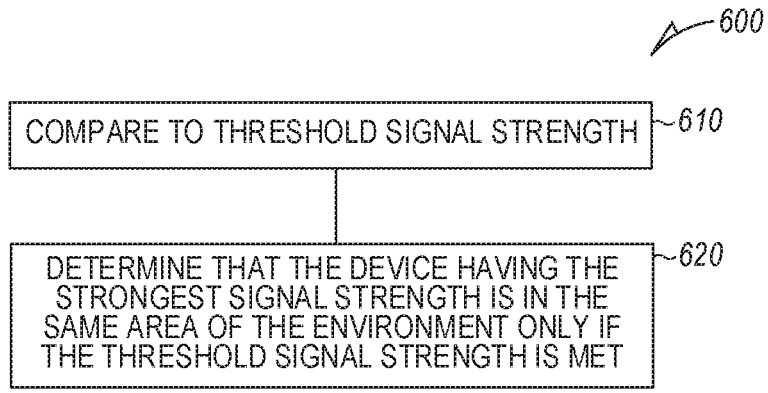
FIG. 6 is a flowchart illustrating a computer implemented method of determining that the other wireless device corresponding to the strongest signal strength is in the same area of the environment according to an example environment.

FIG. 6 is a flowchart illustrating a computer implemented method 600 of determining that the other wireless device corresponding to the strongest signal strength is in the same area of the environment. Method 600 begins by comparing the strongest signal strength to a threshold signal strength at operation 610. At operation 620, the naming mechanism determines that the other wireless device having the strongest signal strength is in the same area of the environment only if the threshold signal strength is met.

Figure 7:
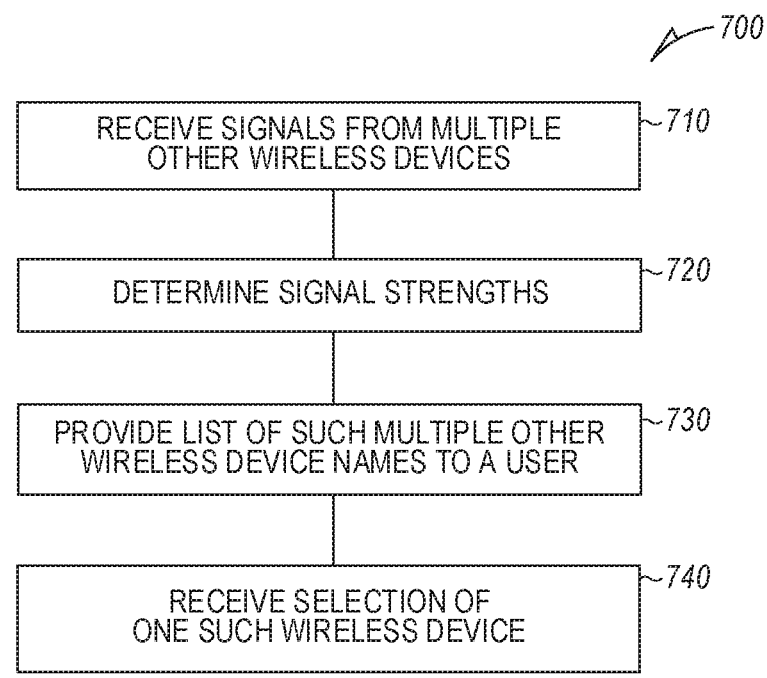
FIG. 7 is a flowchart illustrating an alternative computer implemented method of determining that the first other wireless device is likely, in the same area of an environment according to an example environment.

FIG. 7 is a flowchart illustrating an alternative computer implemented method 700 of determining that the first other wireless device is likely in the same area of an environment. Method 700 begins by receiving signals from multiple other wireless devices at operation 710. At operation 720, signal strengths are determined based on signals received from the multiple other wireless devices. A list of such multiple other wireless device names is provided via a user interface to a user at operation 730. A selection of one such multiple other wireless device names at operation 740 is received from the user interface. Automatic naming then proceeds based on such selection.

Figure 8:
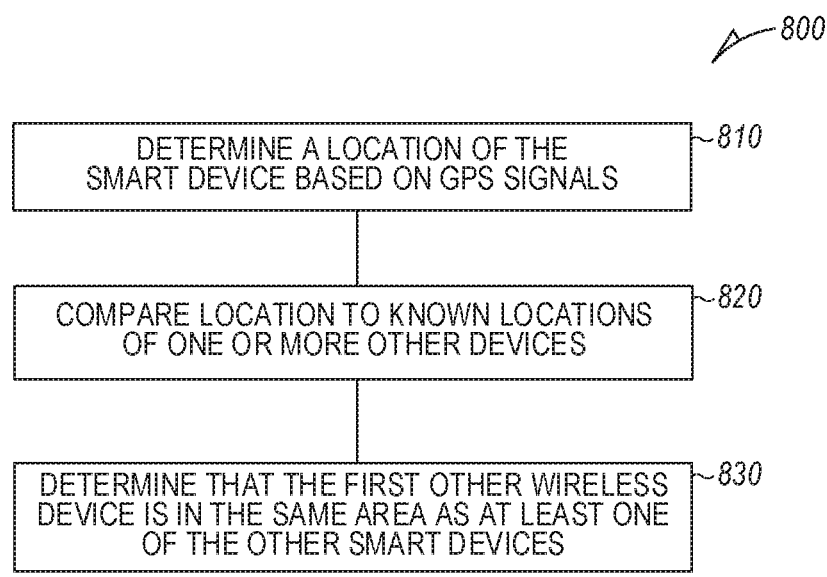
FIG. 8 is a flowchart illustrating a further computer implemented method of determining that the first other wireless device is likely in the same area of an environment according to an example environment.

FIG. 8 is a flowchart illustrating a further computer implemented method 800 of determining that the first other wireless device is likely in the same area of an environment. Method 800 begins by determining a location of the smart device based on UPS signals at operation 810. The determined location is compared at operation 820 to known locations of one or more other smart devices. At operation 830, method 800 determines that the first other wireless device is in the same area of the environment as at least one of the other smart devices responsive to such comparing.

Figure 9:
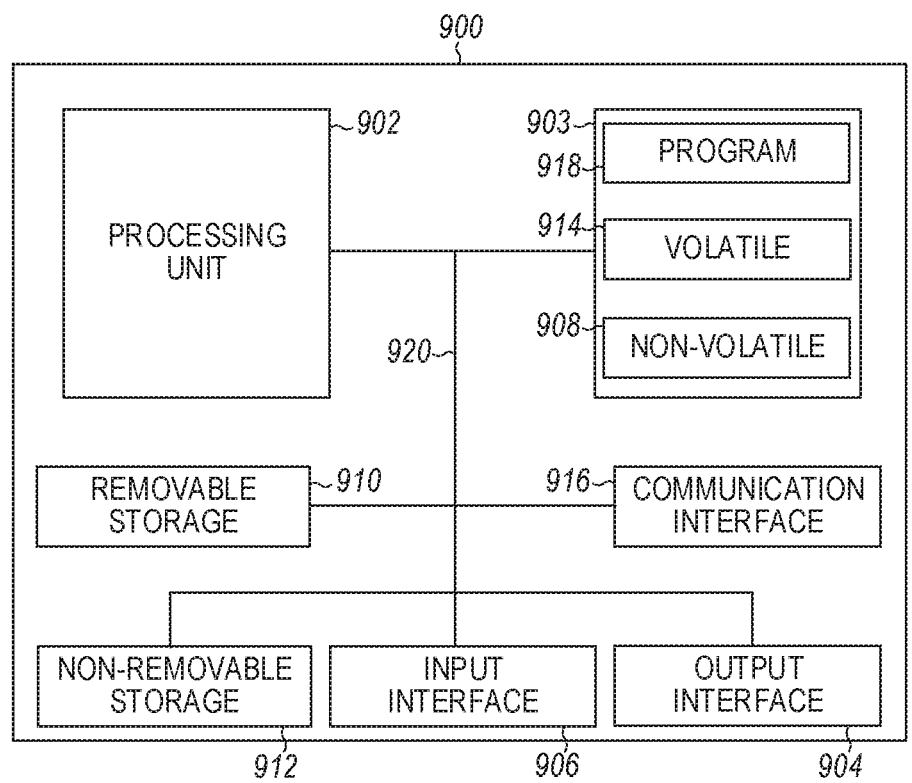
FIG. 9 is a block schematic diagram of a computer system to implement one or more example embodiments.

FIG. 9 is a block schematic diagram of a computer system 900 for running a naming mechanism to automatically name smart devices installed in an environment such as home or other structure according to example embodiments. All components need not be used in various embodiments.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, smart storage device (SSD), or other computing device including the same or similar elements as illustrated and described with regard to FIG. 9. Devices, such as smartphones, tablets, and smartwatches, are generally collectively referred to as mobile devices or user equipment.

Although the various data storage elements are illustrated as part of the computer 900, the storage may also or alternatively include cloud-based storage accessible via a network, such as the Internet or server-based storage. Note also that an SSD may include a processor on which the parser may be run, allowing transfer of parsed, filtered data through FO channels between the SSD and main memory.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 900 are connected with a system bus 920.

Computer-readable instructions stored on a computer-readable medium are executable by the processing unit 902 of the computer 900, such as a program 918. The program 918 in some embodiments comprises software to implement one or more methods described herein, including user interfaces for use in naming smart devices. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 918 along with the workspace manager 922 may be used to cause processing unit 902 to perform one or more methods or algorithms described herein.

Examples

A computer implemented method of naming a smart wireless device includes detecting a first other wireless device, determining that the first other wireless device is likely in a same area of an environment, obtaining a first name of the first other wireless device, and generating a name for the smart wireless device as function of the first name of the first other wireless device in response to the first other wireless device having been determined to be in the same area of the environment.

2. The method of example 1 wherein the first name contains an identifier of the same area, and wherein the generated name includes the identifier of the same area and an identifier of the smart wireless device.

3. The method of example 1 wherein determining that the first other wireless device is likely in the same area of an environment includes determining a signal strength based on signals received from the first other wireless device, comparing the determined signal strength to a same area threshold signal strength, and determining that the first other wireless device is in the same area of the environment responsive to such comparing.

4. The method of example 3 wherein the signal strength being greater than the same area threshold is used to determine that the first other wireless device is in the same area of the environment.

5. The method of example 1 wherein determining that the first other wireless device is likely in the same area of an environment includes receiving signals from multiple other wireless devices, determining signal strengths based on signals received from the multiple other wireless devices, comparing the determined signal strengths to identify the strongest signal strength, and determining that the other wireless device corresponding to the strongest signal strength is in the same area of the environment responsive to such comparing.

6. The method of example 5 wherein determining that the other wireless device corresponding to the strongest signal strength is in the same area of the environment includes comparing the strongest signal strength to a threshold signal strength and wherein determining that the other wireless device having the strongest signal strength is in the same area of the environment is dependent on such comparing to the threshold signal strength.

7. The method of example 1 wherein determining that the first other wireless device is likely in the same area of an environment includes receiving signals from multiple other wireless devices, determining signal strengths based on signals received from the multiple other wireless devices, providing a list of such multiple other wireless device names via a user interface, and receiving a selection of one such multiple other wireless device names from the user interface.

8. The method of example 1 wherein determining that the first other wireless device is likely in the same area of an environment includes determining a location of the smart device based on GPS signals or triangulation, comparing the determined location to known locations of one or more other smart devices, and determining that the first other wireless device is in the same area of the environment as at least one of the other smart devices responsive to such comparing.

9. The method of example 1 wherein the environment comprises a home and areas comprise rooms of the home.

10. A machine-readable storage device has instructions for execution by a processor of a machine to cause the processor to perform operations to perform a method. The operations include detecting a first other wireless device, determining that the first other wireless device is likely in a same area of an environment, obtaining a first name of the first other wireless device, and generating a name for the smart wireless device as function of the first name of the first other wireless device in response to the first other wireless device having been determined to be in the same area of the environment.

11. The device of example 10 wherein the first name contains an identifier of the same area, and wherein the generated name includes the identifier of the same area and an identifier of the smart wireless device.

12. The device of example 10 wherein determining that the first other wireless device is likely in the same area of an environment includes determining a signal strength based on signals received from the first other wireless device, comparing the determined signal strength to a same area threshold signal strength, and determining that the first other wireless device is in the same area of the environment responsive to such comparing.

13. The device of example 12 wherein the signal strength being greater than the same area threshold is used to determine that the first other wireless device is in the same area of the environment.

14. The device of example 10 wherein determining that the first other wireless device is likely in the same area of an environment includes receiving signals from multiple other wireless devices, determining signal strengths based on signals received from the multiple other wireless devices, comparing the determined signal strengths to identify the strongest signal strength, and determining that the other wireless device corresponding to the strongest signal strength is in the same area of the environment responsive to such comparing.

15. The device of example 14 wherein determining that the other wireless device corresponding to the strongest signal strength is in the same area of the environment includes comparing the strongest signal strength to a threshold signal strength and wherein determining that the other wireless device having the strongest signal strength is in the same area of the environment is dependent on such comparing to the threshold signal strength.

16. The device of example 10 wherein determining that the first other wireless device is likely in the same area of an environment includes receiving signals from multiple other wireless devices, determining signal strengths based on signals received from the multiple other wireless devices, providing a list of such multiple other wireless device names via a user interface, and receiving a selection of one such multiple other wireless device names from the user interface.

17. A device includes a processor and a memory device coupled to the processor and having a program stored thereon for execution by the processor to perform operations. The operations include detecting a first other wireless device, determining that the first other wireless device is likely in a same area of an environment, obtaining a first name of the first other wireless device, and generating a name for the smart wireless device as function of the first name of the first other wireless device in response to the first other wireless device having been determined to be in the same area of the environment.

18, The device of example 17 wherein the first name contains an identifier of the same area, and wherein the generated name includes the identifier of the same area and an identifier of the smart wireless device.

19. The device of example 17 wherein determining that the first other wireless device is likely in the same area of an environment includes determining a signal strength based on signals received from the first other wireless device, comparing the determined signal strength to a same area threshold signal strength, and determining that the first other wireless device is in the same area of the environment responsive to such comparing, wherein the signal strength being greater than the same area threshold is used to determine that the first other wireless device is in the same area of the environment.

20. The device of example 17 wherein determining that the first other wireless device is likely in the same area of an environment includes receiving signals from multiple other wireless devices, determining signal strengths based on signals received from the multiple other wireless devices, comparing the determined signal strengths to identify the strongest signal strength, and determining that the other wireless device corresponding to the strongest signal strength is in the same area of the environment responsive to such comparing.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method of naming a smart wireless device, the method comprising:
   detecting a first other wireless device;
   determining that the first other wireless device is likely in a same area of an environment as the smart wireless device;
   obtaining a first name of the first other wireless device wherein the first name contains an identifier of the same area of the environment; and
   generating a name for the smart wireless device as function of the first name of the first other wireless device in response to the first other wireless device having been determined to be in the same area of the environment wherein the generated name includes the identifier of the same area of the environment and an identifier of the smart wireless device.

2. The method of claim 1 wherein determining that the first other wireless device is likely in the same area of an environment comprises:
   determining a signal strength based on signals received from the first other wireless device;
   comparing the determined signal strength to a same area threshold signal strength; and
   determining that the first other wireless device is in the same area of the environment, comprising a room, responsive to such comparing.

3. The method of claim 2 wherein the signal strength being greater than the same area threshold is used to determine that the first other wireless device is in the same area of the environment.

4. The method of claim 1 wherein determining that the first other wireless device is likely in the same area of an environment comprises:
   receiving signals from multiple other wireless devices at the smart wireless device;
   determining signal strengths based on signals received from the multiple other wireless devices;
   comparing the determined signal strengths to identify the strongest signal strength; and
   determining that, the other wireless device corresponding to the strongest signal strength is in the same area of the environment as the smart wireless device responsive to such comparing.

5. The method of claim 4 wherein determining that the other wireless device corresponding to the strongest signal strength is in the same area of the environment comprises:
   comparing the strongest signal strength to a threshold signal strength; and
   wherein determining that the other wireless device having the strongest signal strength is in the same area of the environment is dependent on such comparing to the threshold signal strength.

6. The method of claim 1 wherein determining that the first other wireless device is likely in the same area of an environment comprises:
   receiving signals from multiple other wireless devices;
   determining signal strengths based on signals received from the multiple other wireless devices;
   providing a list of such multiple other wireless device names via a user interface; and
   receiving a selection of one such multiple other wireless device names from the user interface.

7. The method of claim 1 wherein determining e first other wireless device is likely in the same area of an environment comprises:
   determining a location of the smart device based on GPS signals or triangulation;
   comparing the determined location to known locations of one or more other smart devices; and
   determining that the first other wireless device is in the satire area of the environment as at least one of the other smart devices responsive to such comparing.

8. The method of claim 1 wherein the environment comprises a home and areas comprise rooms of the home.

9. A machine-readable storage device having instructions for execution by a processor of a machine to cause the processor to perform operations to perform a method, the operations comprising:
   detecting a first other wireless device;
   determining that the first other wireless device is likely in a same area of an environment as a smart wireless device;
   obtaining a first name of the first other wireless device wherein the first name contains an identifier of the same area of the environment; and
   generating a name for the smart wireless device as function of the first name of the first other wireless device in response to the first other wireless device having been determined to be in the same area of the environment wherein the generated name includes the identifier of the same area of the environment and an identifier of the smart wireless device.

10. The device of claim 9 wherein determining that the first other wireless device is likely in the same area of an environment comprises:
    determining a signal strength based on signals received from the first other wireless device;
    comparing the determined signal strength to a same area threshold signal strength; and
    determining that the first other wireless device is in the same area of the environment responsive to such comparing.

11. The device of claim 10 wherein the signal strength being greater than the same area threshold is used to determine that the first other wireless device is in the same area of the environment.

12. The device of claim 9 wherein determining that the first other wireless device is likely in the same area of an environment comprises:
    receiving signals from multiple other wireless devices;
    determining signal strengths based on signals received from the multiple other wireless devices;
    comparing the determined signal strengths to identify the strongest signal strength; and
    determining that the other wireless device corresponding to the strongest signal strength is in the same area of the environment responsive to such comparing.

13. The device of claim 12 wherein determining that the other wireless device corresponding the strongest, signal strength is in the same area of the environment comprises:
    comparing the strongest signal strength to a threshold signal strength; and
    wherein determining that the other wireless device having the strongest signal strength is in the same area of the environment is dependent on such comparing to the threshold signal strength.

14. The device of claim 9 wherein determining that the first other wireless device is likely in the same area of an environment comprises:

receiving signals from multiple other wireless devices;
determining signal strengths based on signals received from the multiple other wireless devices;
providing a list of such multiple other wireless device names via a user interface; and
receiving a selection of one such multiple other wireless device names from the user interface.

15. A device comprising:
a processor; and
a memory device coupled to the processor and having a program stored thereon for execution by the processor to perform operations comprising:
   detecting a first other wireless device;
   determining that the first other wireless device is likely in a same area of an environment as a smart wireless device;
obtaining a first name of the first other wireless device wherein the first name contains an identifier of the same area of the environment; and
generating a name for the smart wireless device as function of the first name of the first other wireless device in response to the first other wireless device having been determined to be in the same area of the environment wherein the generated name includes the identifier of the same area of the environment and an identifier of the smart wireless device.

16. The device of claim 15 wherein determining that the first other wireless device like in the same area of an environment comprises:
   determining a signal strength based on signals received from the first other wireless device;
   comparing the determined signal strength to a same area threshold signal strength; and
   determining that the first other wireless device is in the same area of the environment responsive to such comparing, wherein the signal strength being greater than the same area threshold is used to determine that the first other wireless device is in the same area of the environment.

17. The device of claim 15 wherein determining that the first other wireless device like in the same area of an environment comprises:
   receiving signals from multiple other wireless devices;
   determining signal strengths based on signals received from the multiple other wireless devices;
   comparing the determined signal strengths to identify the strongest signal strength; and
   determining that the other wireless device corresponding to the strongest signal strength is in the same area of the environment responsive to such comparing.

* * * * *